United States Patent [19]

Leibeling

[11] 4,278,272
[45] Jul. 14, 1981

[54] HYDROPNEUMATIC SPRING SUSPENSION DEVICE FOR VEHICLES

[75] Inventor: Heinz Leibeling, Siegburg, Fed. Rep. of Germany

[73] Assignee: Boge GmbH, Eitorf, Fed. Rep. of Germany

[21] Appl. No.: 81,560

[22] Filed: Oct. 3, 1979

[30] Foreign Application Priority Data

Oct. 5, 1978 [DE] Fed. Rep. of Germany ....... 2843436

[51] Int. Cl.³ ............................................. B60G 11/26
[52] U.S. Cl. ................................ 280/708; 267/65 D; 280/710
[58] Field of Search ............... 280/672, 683, 698, 702, 280/708, 710; 267/65 D, DIG. 1

[56] References Cited

U.S. PATENT DOCUMENTS

| | | | |
|---|---|---|---|
| 2,712,946 | 7/1955 | Cicero | 280/702 |
| 2,970,614 | 2/1961 | Christensen | 267/65 D |
| 3,620,542 | 11/1971 | Hovorka | 280/702 |
| 3,623,745 | 11/1971 | Taylor | 280/710 |

Primary Examiner—Joseph F. Peters, Jr.
Assistant Examiner—Ross Weaver
Attorney, Agent, or Firm—William R. Hinds

[57] ABSTRACT

A hydropneumatic spring suspension, especially for automotive vehicles with a load bed, includes a hydropneumatic spring element that produces gaseous elastic forces and damping forces by a work piston slidable in an oil-filled work chamber that is loaded by a gas cushion, such that the pressure of the gas cushion determines a variable bearing force or load of the spring element. To increase the bearing force, a pressure medium (oil or gas) is supplied to the spring element. In the instant invention, this pressure medium is supplied from an auxiliary cylinder connected with a load bed, and an auxiliary piston provided with receiving devices for a load unit. When the load unit is set on the piston, the piston is moved from an extended position into a retracted position to supply pressure medium to the spring element, and hence increase the bearing force of the spring element. Preferably the fully retracted position of the auxiliary piston is limited by application of the load unit to a load plate on the load bed such that during transport, the load unit is supported by the load bed, and not by the auxiliary piston or pistons as such.

7 Claims, 4 Drawing Figures

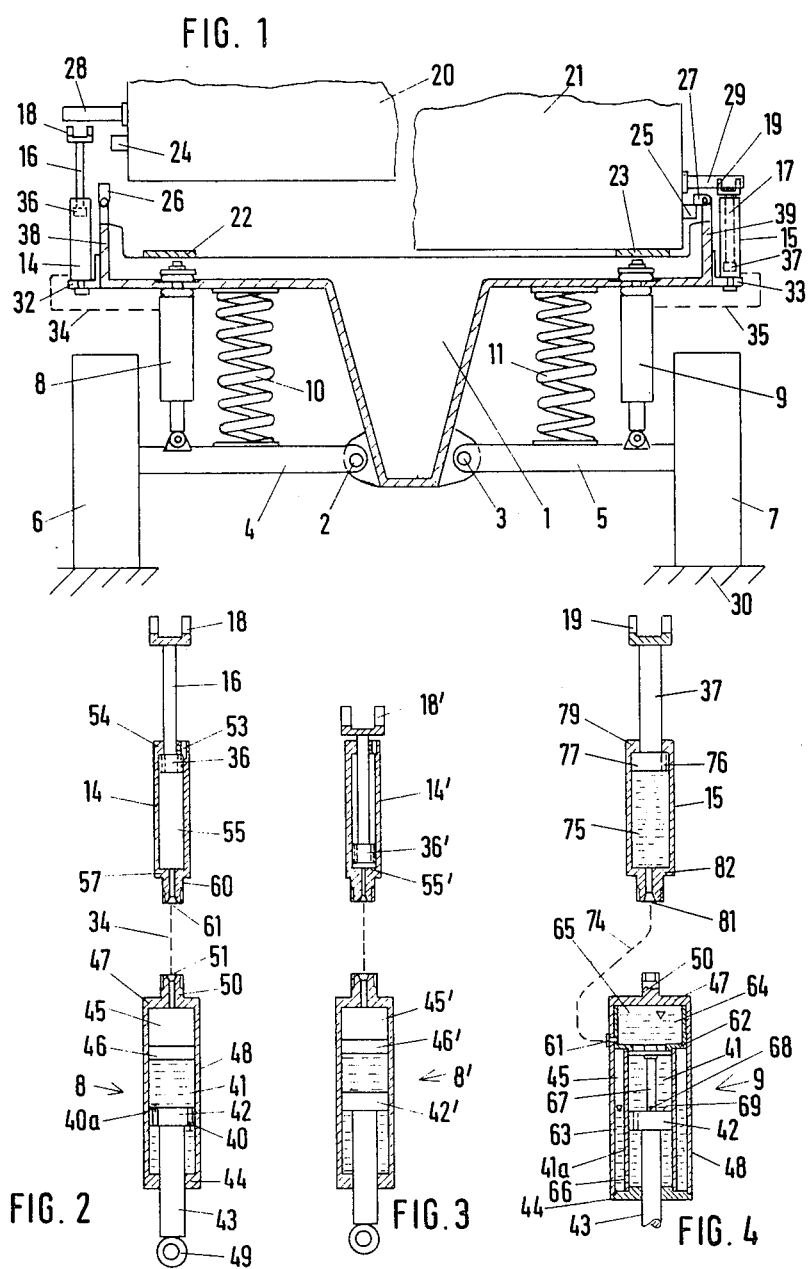

HYDROPNEUMATIC SPRING SUSPENSION DEVICE FOR VEHICLES

FIELD OF THE INVENTION

This invention relates to hydropneumatic spring suspension devices, especially for automotive vehicles with a load-carrying bed, comprising a hydropneumatic element that produces damping and gaseous elastic forces with a working piston slidable in an oil-filled work chamber that is loaded by a gas cushion, whereby the pressure of the gas cushion determines a variable bearing force or load of the spring suspension mechanism. A pressure source is provided from which a pressure medium, oil or gas, is delivered to the spring suspension element to increase the bearing force.

BACKGROUND AND SUMMARY OF THE INVENTION

Spring suspension arrangements as mentioned above are suitable for, for instance, a flat bed vehicle onto and off which a load unit is loaded or off-loaded, a typical load unit being perhaps a dwelling unit such as a camper body. In these vehicles, the loading by the load unit generally is very great in proportion to the actual weight of the vehicle, and by the mentioned increase of the bearing force, the springing of the vehicle when the load unit is set on it is reduced, and the spring properties can be favorably influenced for comfortable springing.

In a spring suspension arrangement of this type, known from German OS No. 20 04 510, a self-pumping and level-regulating spring element has a high pressure chamber and a low pressure chamber, whereby in the down-adjusted state the same pressure prevails in both chambers, and a bearing load or force, the "basic load or force" associated with the empty state of the vehicle, is determined by the pressure of the low pressure chamber, whereby to increase the basic load, pressure media are supplied by pumping devices, from a shunt chamber into the low pressure chamber. In this German document, it is indicated that the shunt chamber can be provided by a cylinder with a piston that can be moved back and forth by means of a screw pin. Such actuation of a piston is disadvantageously cumbersome.

The instant invention is concerned with the problem of effecting the forwarding of pressure medium from a shunt chamber or the like by simple means, in a spring suspension of the above mentioned type, and the invention accordingly includes spring suspensions with a high pressure chamber and a low pressure chamber as in the German document, and also those that have a high pressure chamber exclusively. The problem is solved in that the shunt chamber or pressure source comprises an auxiliary cylinder connected with the load bed, with an auxiliary piston provided with receiving or holding devices for a load unit, such that the piston is automatically thrust from an extended state to a retracted state when the load unit is set on, resulting in the delivery of pressure medium from the shunt chamber to the spring suspension elements.

In accordance with the invention, advantageously the weight of the load unit is used to effect delivery of pressure medium from the shunt chamber, i.e., the auxiliary cylinder, into the spring suspension element, and for this no special actuating means are required. Preferably the retracted position of the auxiliary piston is limited by engagement of the load unit onto the load bed, such that when the load unit rests on the load bed, the auxiliary piston is in its fully retracted position. In off-loading the load unit, the pressure medium flows back into the auxiliary cylinder under the effect of the gas cushion in the spring element, and the auxiliary piston is again thrust into its extended position. In this way, the spring suspension element and the auxiliary cylinder influence each other.

The hydropneumatic spring suspension device according to the invention can be made fully bearing or partly bearing together with another spring suspension device for one or more axles. If the load bed essentially is borne by an axle equipped with two spring suspension elements, then in the simplest case each spring element is connected with an auxiliary cylinder. Groups of spring elements and auxiliary cylinders for one or more axles are also possible, which mutually influence each other, and may be connected with one auxiliary cylinder for one or more spring elements, or vice versa.

Other features, objects and advantages of the invention will be apparent to those skilled in the art from the ensuing description of preferred embodiments, taken in conjunction with the appended drawings.

BRIEF DESCRIPTION OF THE DRAWINGS

FIG. 1 shows schematically in transverse section, viewed in the longitudinal direction, an axle portion of a vehicle, showing a load unit on the left hand side off-loaded from the load bed, and a load unit on the right hand side supported by the load bed.

FIG. 2 illustrates diagrammatically a spring suspension arrangement according to the invention, comprising a hydropneumatic spring element of a single-tube type, and an auxiliary cylinder with extended auxiliary piston.

FIG. 3 shows the spring arrangement according to FIG. 2 with a retracted auxiliary piston, under loaded conditions.

FIG. 4 shows a spring arrangement according to the invention, comprising a hydropnuematic self-pumping spring element, of two-tube type, and an auxiliary cylinder with extended auxiliary piston.

DESCRIPTION OF THE PREFERRED EMBODIMENTS

The vehicle schematically illustrated in FIG. 1 has a load bed 1, and pivot axles 4 and 5 are suspended with mirror symmetry at articulation points 2 and 3. The axles have at their ends vehicle wheels 6 and 7 standing on road surface 30. Load bed 1 is spring-suspended by partly-supporting hydropneumatic spring elements 8 and 9, together with helical springs 10 and 11 with respect to vehicle wheels 6 and 7, known connecting elements for spring elements 8 and 9 being provided on load bed 1 and axles 4 and 5. Load bed 1 has load plates 22 and 23 and lateral members 38 and 39 that have outwardly directed flanges 32 and 33. On the left hand flange 32 there is fixed a perpendicularly upward extending left auxiliary cylinder 14, and on the right hand flange 33 there is a perpendicularly upward extending right auxiliary cylinder 15. Left hand cylinder 14 is connected by a conduit 34 with the left hand spring element 8, and the right hand cylinder 15 is connected via a conduit 35 with the right hand spring element 9.

An auxiliary piston 36 is slidable in the left hand auxiliary cylinder 14, and is fixed to the inner end of an auxiliary piston rod 16 that extends from auxiliary cylinder 14, and under the effect of excess pressure in auxiliary cylinder 14 it is in an entirely extended position. The issuing end of auxiliary piston rod 16 presents a fork 18. A load unit 20 with a laterally projecting pin 28 and a projection 24 is held in a suspended position by a hoist device, not shown, in which pin 28 is opposite fork 18, ready for engagement. Lateral member 38 is equipped with a perpendicularly disposed movable lock device 26 of any convenient kind, for association with projection 24. Vehicle wheel 6 is loaded by the intrinsic weight of load bed 1.

Auxiliary piston 37, slidably disposed in the right hand auxiliary cylinder 15, is fixed to the inner end of an auxiliary piston rod 17, whose end issuing from auxiliary cylinder 15 presents a fork 19. A load unit shown at 21 is provided with a laterally projecting pin 29 and a projection 25, and rests freely on load plate 23, whereby pin 29 engages in fork 19, and auxiliary piston 37 is moved to its retracted position by the weight of load unit 21. Lateral member 39 is equipped with a lock device 27 which is laid about horizontally, locking projection 25 and load unit 21 firmly on load plate 23 and thereby holding it on load bed 1.

If load unit 20 and load unit 21 are regarded as a single load unit 20/21, then on the left hand side of FIG. 1 load unit 20/21 is shown off-loaded from bed 1, being shown on the right hand side as being set on bed 1. The arrangement advantageously is such that the center of gravity of load unit 20/21 more or less corresponds to the position of pins 28 and 29. Spring elements 8 and 9 and auxiliary cylinders 14 and 15 mutually influence each other, in that in setting load unit 20/21 pressure medium is delivered from auxiliary cylinders 14 and 15 into spring elements 8 and 9, and upon off-loading, pressure medium flows back from elements 8 and 9 into auxiliary cylinders 14 and 15, which will be particularly clear with reference to the ensuing description in connection with FIGS. 2-4.

Referring to the diagrammatic illustration in FIG. 2, a spring element 8 presents an oil-filled work chamber 41 and a work piston 42 on the inner end of a piston rod 43 that extends outwardly through end wall 44, which closes work chamber 41. Piston 42 is slidable in chamber 41 and is provided with damping valves 40 and 40a for both directions of flow. There is also a movable separating piston 46 that defines the work chamber, and on the other side there is a gas chamber 45 containing a gaseous cushion of high pressure, whereby work chamber 41 and gas chamber 45 are made as a cylinder 48 that is closed off by an end wall 47.

Piston rod 43 is provided at its free end with a fastening eye 49 that can be connected with a wheel suspension, e.g., with pivot axle 4 according to FIG. 1. End wall 47 is provided with a hollow fastening pin 50 that ends in a conduit connection 51 and may be connected with a vehicle structure, e.g., with load bed 1 according to FIG. 1. An auxiliary cylinder 14 presents a gas chamber 55, an auxiliary piston 36 sealingly slidable in auxiliary cylinder 14 on the inner end of an auxiliary piston rod 16 that emerges from end wall 54 of auxiliary cylinder 14, and an end wall 57 that closes off gas chamber 55. Auxiliary piston rod 16 is provided with a fork 18 at its free end, which may serve as a retaining device for a load unit, e.g., for pin 28 of load unit 20 according to FIG. 1. End wall 57 is provided with a hollow fastening pin 60 that ends in a conduit connection 61, and may serve to fasten the cylinder to a load bed, e.g., to flange 32 of load bed 1 according to FIG. 1. Conduit connections 51 and 61 are connected by a conduit 34 that is indicated by dashed lines.

Referring to FIG. 3, spring element 8' and auxiliary cylinder 14' have the same parts as spring element 8 and auxiliary cylinder 14 shown in FIG. 2. However, auxiliary piston 36' is in an almost entirely retracted position, whereby fork 18', working piston 42' and separating piston 46' have an altered position with respect to the corresponding elements shown in FIG. 2, and gas chambers 45' and 55' have changed magnitudes with respect to gas chambers 45 and 55. If it is assumed that spring elements 8, 8' and auxiliary cylinders 14, 14' according to FIGS. 2 and 3 are incorporated in the vehicle of FIG. 1, analogously to the arrangement there indicated, and that FIG. 2 shows the position of the spring suspension with load 20 removed, and FIG. 3 shows the position with load unit 20 set on the load bed, the position of, for instance, piston 36 would be determined by the static equilibrium of the partial weight of load bed 1 and the gaseous elastic force of spring element 8 plus the resilience of helical spring 10, and the position of piston 36' would be determined by the static equilibrium of load bed 1 plus the partial weight of load unit 20 and the gaseous elastic force of spring element 8' plus the resilience of helical spring 10. The quantity of gas in gas chamber 45' when auxiliary piston 36' is retracted as shown in FIG. 3 is greater than the amount of gas in chamber 45 with auxiliary piston 36 extended, by approximately the difference of the quantities of gas in chambers 55 and 55', and accordingly there is an increase in the pressure in gas chamber 45' with respect to that in gas chanber 45, as will be clear from the laws of gaseous behavior. Gas chamber 45' is somewhat smaller than gas chamber 45, because separating piston 46' is displaced in the direction of end wall 47 with respect to separating piston 46 in keeping with the thrust-in position of piston rod 43'. It is assumed here that the increase of pressure in gas chamber 45' that was mentioned above, depending upon the greater quantity of gas, is not sufficient to bear the partial weight of load unit 20, and a springing of pivot axle 4 with corresponding springing and increases of the bearing forces of spring element 8' and helical spring 10 has resulted.

The different quantities of gases contained in gas chambers 45 and 45' govern the dynamic springing behavior of spring elements 8 and 8', respectively, if the choke resistance of conduit 34 or of devices especially provided in conduit 34 is so great that gas chambers 55 and 55' do not participate in the dynamic pressure fluctuations of gas chambers 45 and 45' in the swinging movements of work pistons 42 and 42'. Conduit 34 can also be made choke free or equipped with selected choke devices, whereby gas chambers 55 and 55' follow the dynamic pressure fluctuations of gas chambers 45 and 45' exactly or with a predetermined delay. Then in the first instance gas chambers 55 and 55' can affect the course of the dynamic gaseous elastic forces of elements 8 and 8' in a desired sense, and in the second case pneumatic damping forces can be built up supplementarily.

The effective piston surface of the auxiliary piston is advantageously so designed that the thrusting-out force of the retracted auxiliary piston 36 resulting from the pressure of gas chamber 55 is about equal, or preferably somewhat less, than the partial weight of the load unit 20, and the stroke of auxiliary postion 36 from the extended to the retracted position is such that a desired specific increase of the gaseous elastic force of element 8 will be attained, determined by the stroke volume of auxiliary piston 36. According to examples that have been calculated in which the partial weight of load unit 20 is about equal to the partial weight of load bed 1, the surface of auxiliary piston 36 moves by an amount that is of the order of magnitude of that of the surface of piston rod 43, and the stroke of auxiliary piston 36 is of the order of 30 cm. This entails no special effort for production of the spring suspension according to the invention if the load unit 20 has to be raised by about 30 cm above the plane of load bed 1 until pin 28 engages in fork 18, a lift device being necessary in any case.

In the spring suspension according to FIG. 4, a spring element 9 has a work cylinder 41a that forms an oil-filled work chamber 41, a work piston 42 slidable therein and provided with damping valves that are not shown, on the inner end of a piston rod 43 which extends outwardly from an end wall 44 that closes work cylinder 41, a partition 62 on the side turned away from end wall 44 that limits work chamber 41, a high pressure chamber 63 that surrounds work chamber 41a in an annular fashion, the chamber 63 being limited by cover 44 and partition 62 and partly filled with oil and partly filled with gas, and on the other side of partition 62 there is a low pressure chamber 64 partly filled with oil and partly with gas, the chamber being limited by an end wall 47, whereby the mentioned parts are incorporated in an outer tube 48 that is closed off by cover 44 and floor 47 which has a fastening pin 50. High pressure chamber 63 contains a gas chamber 45, and on the oil side is in the open connection via an opening 66 with work chamber 41. Low pressure chamber 64 contains a gas chamber 65, and on the oil side it is connected with work chamber 41 via a hollow pump rod 67 fixed to partition 62, and the hollow piston rod 43, in a self-pumping level regulating way that is known, for example, from German OS No. 20 04 510, whereby an intake valve (not shown) on the free end of pump rod 67 leads into piston rod 43, and from this a discharge valve (not shown) leads into work chamber 41. In pump rod 67 there is provision of a regulating opening 68 leading from work chamber 41 into low pressure chamber 64, which regulating opening, in stroke motions of work piston 42 in the illustrated level range, is alternatingly laid free and closed by a control edge 69 of work piston 42. In the unregulated state of the spring element 9 with free regulating opening 68, the same pressure prevails in high pressure chamber 63 and low pressure chamber 64.

Auxiliary cylinder 15 of FIG. 4 presents an oil chamber 75, a guide piston 77 on the end of an auxiliary piston rod 37, slidable in auxiliary cylinder 15 and provided with a penetrating opening 76, piston rod 37 emerging sealingly from cover 79 of auxiliary cylinder 15, and being provided with a fork 19. The device likewise has an end wall 82 that defines oil chamber 75 and is provided with a conduit connection 81.

Low pressure chamber 64 is provided with a conduit connection 61 in the region of partition 62, from which connection a conduit 74 leads to conduit connection 81. When auxiliary piston rod 37 is pushed in under the weight of a load unit, oil flows from auxiliary cylinder 15 into low pressure chamber 64, and when the load unit is off-loaded, oil flows back from low pressure chamber 64 into auxiliary cylinder 15, and auxiliary piston rod 37 again emerges.

When auxiliary piston rod 37 is pushed in, the amount of gas contained in gas chambers 65 and 45 is compressed to a smaller volume, whereby the oil forced through the regulating opening 68 or through the mentioned intake valve of pump rod 67 and discharge valve of piston rod 43 flows from lower pressure chamber 64 into work chamber 41, and from there further through opening 66 into high pressure chamber 63 until there is an equilibrium of pressure with that of low pressure chamber 64. Thereby in the unregulated state of spring element 9 the gaseous elastic force that is present is increased. In addition, the gaseous elastic force of spring element 9 can be substantially increased in the regulated state, in a way known for example from German OS No. 20 04 510. It is obvious that in the case of a spring device according to FIG. 4 with self-pumping spring element 9, the partial weight of a load unit is substantially greater, for example three to four times greater, than the partial weight of the load bed, and yet with the load unit set, the indicated regulating level of FIG. 4 can be attained.

Having thus described embodiments of my invention as required by the statutes and attendant regulations, I claim:

1. In a hydropneumatic spring suspension, especially for automotive vehicles with a load bed, comprising a hydropneumatic spring element that produces gaseous elastic forces and damping forces with a work piston slidable in an oil-filled work chamber that is loaded by a gas cushion whereby the pressure of the gas cushion determines a variable bearing force and spring characteristic of the spring element, and a shunt chamber from which a pressure medium is supplied to the spring element to vary the bearing force and spring characteristic of the spring element, the improvement wherein said shunt chamber comprises an auxiliary cylinder for connection with a load bed, and an auxiliary piston slidable in said auxiliary cylinder and provided with receiving devices for a load unit to be mounted on the load bed, the auxiliary piston and cylinder being so constructed and arranged that when the load unit is positioned on the load bed the auxiliary piston is automatically forced by the weight of the load unit from an extended position into a retracted position so as to force pressure medium from the auxiliary cylinder to said spring element to increase the pressure of the gas cushion therein and hence increase the bearing force and change the spring characteristic of said spring element.

2. A spring suspension device as claimed in claim 1 wherein the retracted position of said auxiliary piston is determined by supporting engagement of the load unit with the load bed.

3. A hydropneumatic spring suspension as claimed in claim 1 wherein said auxiliary cylinder and auxiliary piston are vertically oriented such that the receiving devices of said auxiliary piston encounter the load unit during downward movement of the load unit toward the load bed so as to move the auxiliary piston from an extended position into its retracted position.

4. Apparatus as claimed in claim 1 comprising a plurality of said hydropneumatic spring elements coupled between the load bed and an axle assembly of a vehicle so as to at least partially support the load bed, and a plurality of said auxiliary cylinder and piston devices carried by the load bed of the vehicle and in fluid communication with the hydropneumatic spring elements so as to variably load and unload the gas cushions thereof upon loading and off-loading, respectively, of a load unit onto the load bed and into and out of engagement with the receiving devices of said auxiliary pistons.

5. Apparatus as claimed in claim 1 wherein said work piston includes damping valves for bidirectional oil flow through the piston.

6. Apparatus as claimed in claim 5 wherein said pressure medium from the auxiliary cylinder is a gas for varying the pressure in said gas cushion.

7. Apparatus as claimed in claim 1 wherein said hydropneumatic spring element is coupled directly to rigid structure of the load bed and axle assembly, said work piston includes damping valves for bidirectional oil flow through the piston, and said pressure medium from the auxiliary cylinder is a gas for varying the pressure in said gas cushion.

* * * * *